Figure 1:
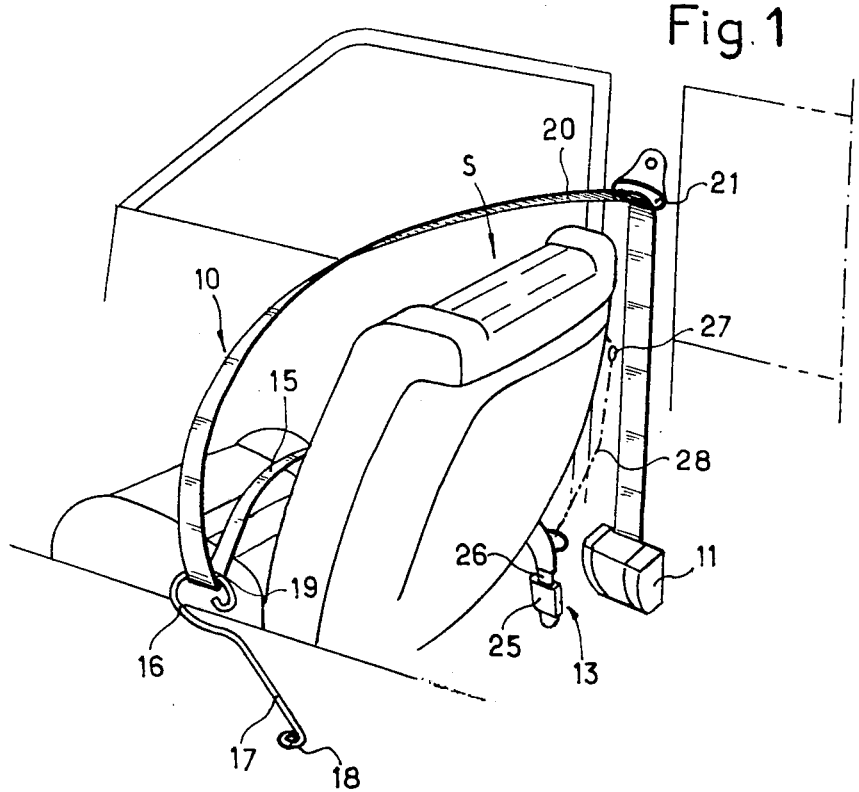

United States Patent [19]

Neveux

[11] 4,118,053
[45] Oct. 3, 1978

[54] SAFETY BELT DEVICE WITH A WINDER/UNWINDER ESPECIALLY FOR AUTOMOBILES

[75] Inventor: René Elie Neveux, Les Clayes-sous-Bois, France

[73] Assignee: Societe Anonyme Francaise du Ferodo, France

[21] Appl. No.: 793,269

[22] Filed: May 3, 1977

[30] Foreign Application Priority Data

May 5, 1976 [FR] France .......................... 76 13259

[51] Int. Cl.² ............................................. B60R 21/02
[52] U.S. Cl. .................................. 280/747; 180/82 C
[58] Field of Search ..................... 280/747, 744, 745; 180/82 C; 297/389

[56] References Cited

U.S. PATENT DOCUMENTS

| | | | |
|---|---|---|---|
| 2,864,437 | 12/1958 | Spring | 297/389 |
| 3,168,158 | 2/1965 | Schoeffler | 280/744 |
| 3,844,001 | 10/1974 | Holmberg | 297/389 |
| 3,957,283 | 5/1976 | Pocobello | 280/747 |
| 3,997,190 | 12/1976 | Seiffer | 280/747 |
| 4,004,821 | 1/1977 | Breitschwerdt | 280/744 |

*Primary Examiner*—Robert R. Song
*Attorney, Agent, or Firm*—Kane, Dalsimer, Kane, Sullivan and Kurucz

[57] ABSTRACT

A safety belt device with a winder/unwinder, especially for an automobile. This device comprises a continuous belt strap, one end of which is fixed to an anchorage point on the vehicle structure and the other end of which is connected to a strap winder/unwinder. The structure of the vehicle is equipped with an attachment means with which the said strap is adapted to cooperate by sliding to provide, under the condition of use of the device, a subabdominal portion and a cross-belt portion which come from the said winder/unwinder. The said anchorage point includes a buckle component which is customary for safety belts and is adapted to be activated directly or indirectly so as to provide separation of the strap end which is fixed to the anchorage point from the structure of the vehicle, this occurring without touching the stop.

8 Claims, 2 Drawing Figures

SAFETY BELT DEVICE WITH A WINDER/UNWINDER ESPECIALLY FOR AUTOMOBILES

The invention relates to a safety belt device with a winder/unwinder, especially for automobiles.

Safety belt devices for motor vehicles are already known comprising a continuous strap, one end of which is fixed onto the structure of the vehicle in such a way as to be irremovable and the other end of which comes from a winder/unwinder, which is also fixed onto the structure of the vehicle, the said strap providing a cross-belt portion and a sub-abdominal portion when, in its working condition, the said strap works in conjunction with an attachment means connected to the structure of the vehicle so as to be able to slide. In certain embodiments, the said attachment means is an open hook carried by a third portion which is anchored to the floor of the vehicle. In other embodiments, the said attachment means is a buckle which is in two parts, one part of which comprises a ring which is crossed by the strap and the other part of which is connected to the structure of the vehicle directly or via a third portion. If such safety belt devices are at the same time simple to use and to make, they suffer from a serious disadvantage due to the fact that, in case of accident, the user of the belt as well as the rescuers can encounter difficulties in rapidly freeing the belt from the body of the user, especially if the attachment means is accessible and detachable with difficulty or with relative difficulty.

It is an object of the invention to provide a belt device of the type mentioned above which obviates this disadvantage.

In this respect, it is an object of the invention to provide such a safety belt device which, in case of accident, allows the occupant of a seat equipped with the device, or the rescuers, to free the user of the belt very quickly, even when the attachment means is inaccessible.

A safety belt device according to the invention, especially for a motor vehicle, comprising a continuous belt strap, one end of which is attached to an anchorage point on the structure of the vehicle and the other end of which is connected to a strap winder/unwinder, the structure of the vehicle being equipped, in addition, with an attachment means with which the said strap is adapted to cooperate by sliding, in order to provide, under the condition of use of the belt, a sub-abdominal portion and a cross-belt portion, one end of which comes from the winder/unwinder, is characterised in that the said anchorage point comprises a buckle component which is customary for safety belts which, activated directly or indirectly, causes separation of the strap end fixed to the said point of the structure of the vehicle, and that occurring without touching the strap.

The opening of this usual buckle is carried out in the customary way, that is to say by depressing a pushbutton, pressing a lever, rotating a catch or pulling on a handle, and the like.

Thus the separation of the strap end fixed to the point of the structure of the vehicle is carried out in a simple way by anyone.

As a variant, the said component is somewhat analogous to a holding jaw or an equivalent mechanical means making possible, on the one hand, a secure and solid fixation of a strap end onto the structure of the vehicle and, on the other hand, immediate separation of the said end from the structure of the vehicle, for example, and without this indication having any limiting characteristic whatsoever, using a pyrotechnical charge.

Irrespective of the form of the embodiment, the activation of the component, which is used to separate the end of the sub-abdominal portion fixed to the said structure from the structure of the vehicle, is carried out using means which are very easily accessible, equally by the user of the device and by an eventual rescuer, and, in this respect, the invention provides that the said means are fitted onto a pillar of the automobile, in the vicinity of the lower part of a door window, so that in case of accident the latter can be broken and the said means easily activated.

In one embodiment, the activation of the detachable anchorage component can be carried out using a multiplicity of elements, one of which can be fitted as indicated above and another of which can, for example, be fitted onto the dashboard or to the outside of the vehicle.

In another embodiment, which applies especially if the same vehicle is equipped with a plurality of devices according to the invention, it is arranged that the same activating element, which may be single or multiple, frees each of the straps from the plurality of devices.

Figure 2:
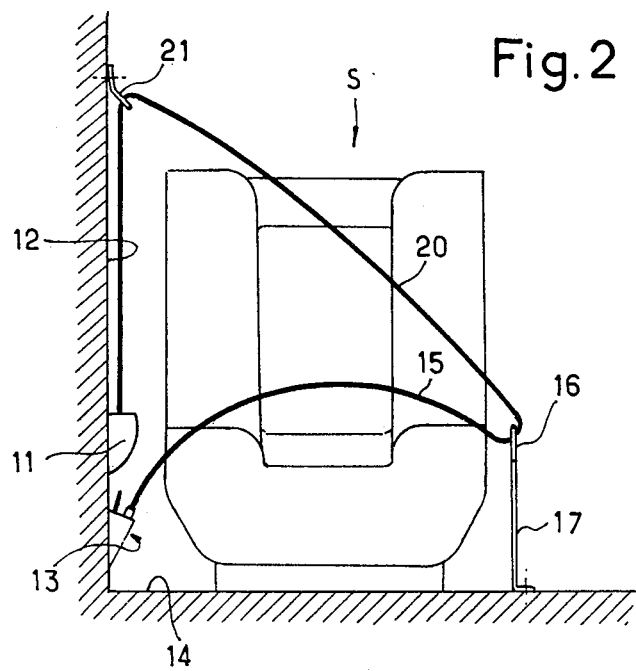

The invention will be properly understood by the description which follows, made by way of example, and by referring to the attached drawing, in which:

FIG. 1 is a view in perspective, from behind, of an automobile seat equipped with a belt device according to the invention, and FIG. 2 is a schematic view, from the front, of a seat equipped with the device according to the invention.

In the embodiment shown in FIGS. 1 and 2, a safety belt device with a winder/unwinder comprises a strap 10, which is continuous, one end of which comes from a winder/unwinder 11 fixed onto a pillar 12 of the automobile and the other end of which is anchored onto the structure of the vehicle by a component 13 fitted to the lower part of the pillar 12 or onto the floor 14. Under the working condition of the belt, the component 13 forms an end of the sub-abdominal portion 15 of the belt and the other end of the said portion is defined by a hook 16, FIG. 1, carried by an arm 17, or a third portion, anchored at 18 to the floor of the vehicle, as is known in itself in automobile safety belt devices of the "three point" type. The hook 16 has a substantially rectilinear part 19, with which the belt strap 10 can co-operate by sliding, and, under the condition of use of the belt, the said hook constitutes an end of the cross-belt portion 20 of the belt, which cross-belt portion, the other end of which is connected to the winder/unwinder 11, is either the said winder itself, if the latter is fixed to an upper part of the pillar, or, as shown in FIGS. 1 and 2, a strap guide 21.

According to the invention, the anchorage device 13 fitted to the lower part of the pillar 12 and onto the side of the seat S which is equipped with the device, is a component which, whilst ensuring the secure fixation of the strap to the vehicle structure, allows, however, the almost immediate separation of the said strap from the structure of the vehicle when an appropriate means is activated, and this occurring without touching the strap.

In the preferred embodiment, the component 13 is a safety belt buckle, one of the two parts 25 of which is fixed to the vehicle so as to be irremovable, and the other part, 26, of which can be separated from the part 25 by manipulating a push-button, by pivoting a lever, rotating a catch, pulling a handle, and the like.

In another embodiment, which is not shown, the component 13 is a mechanical assembly of the holding jaw type.

Irrespective of the construction of component 13, the invention provides for the association of an activation means with the said component, which may be a main or auxiliary means and which is easily accessible by the occupant of the seat S and also by an eventual rescuer. The said means, shown schematically at 27 in FIG. 1, can be fitted onto the pillar 12, in the vicinity of the lower part of a door window and it is connected to the component 13 by a connecting element 28.

This element can be mechanical or electrical, for example to control the ignition of a pyrotechnical charge incorporated in the component 13 and intended to produce separation of the end of the strap 10, which end is fixed to the said component of the structure of the vehicle.

In an embodiment of the device of the invention, an additional means of control of the component 13 is provided on the dashboard or outside the vehicle.

In another embodiment, and when an automobile or another vehicle is equipped with a plurality of devices according to the invention, the same mean 27, or several such means are arranged so that activation of the said means, or of any one of them, produces, simultaneously, the liberation of each of the straps from the devices in order to make it possible, for example in the case of an accident, to rapidly rescue all the occupants of the vehicle.

The operation of a device according to the invention follows directly from that which is stated above.

When the occupant of the seat S wishes to put the belt on he takes hold of the strap 10 which is at that time arranged along the pillar 12 and by pulling on the said strap, extracts a sufficient length from the winder/unwinder 11 so that the strap can be engaged in the hook 16. The strap is then ready to hold the occupant of the seat, in the case where the vehicle receives a bump, when a blocking means, which is contained in the winder, comes into operation, whilst, under normal traffic conditions the occupant of the seat has freedom of movement.

Under normal conditions, when the occupant of the seat S wishes to free himself from the belt, he detaches the strap from the hook 16 and the said strap again takes up its initial position, along the pillar 12, under the action of the winder/unwinder 11.

If, in the case of an accident, the occupant of the seat S cannot free himself from the belt and if the hook 16 is accessible or detachable with difficulty, a rescuer can activate the means 27. Even if the occupant of the seat S leans heavily on the strap 10, the winder/unwinder 11 tends to rewind the strap and when the part 26 of the component 13 which is fixed firmly to the strap, for example a buckle catch of small size, has been freed from the hook 16, the occupant is freed from the belt so that he can be taken out of the vehicle by the rescuer.

The invention is not limited to the embodiment described and represented in FIGS. 1 and 2, in which the attachment means 16 is a hook. The said means can, in effect, consist of a buckle in two parts, one of which comprises a ring which crosses the strap and the other of which is connected to the structure of the vehicle directly or via a third portion, analogous to the portion 17. The ring is then of sufficient size to allow passage of the component 13 or of part of the said component which can be separated from the structure of the vehicle when it is activated by ad hoc means.

What is claimed is:

1. A safety belt device with a winder/unwinder for vehicles, especially of the automobile type, comprising a continuous belt strap one end of which is fixed to an anchorage point on the vehicle structure and the other end of which is connected to a strap winder/unwinder, the structure of the vehicle being equipped in addition with an attachment means with which the said strap is adapted to cooperate by sliding to provide, under the condition of use of the device, a sub-abdominal portion and a cross-belt portion which come from the said winder/unwinder, the said anchorage point comprising a buckle component which is customary for safety belts, which is adapted to be activated directly or indirectly so as to provide separation of the strap end which is fixed to the anchorage point from the structure of the vehicle, this occurring without touching the strap.

2. A safety belt device as claimed in claim 1 and in which the attachment means is an open hook carried by a third portion anchored to the structure of the vehicle.

3. A safety belt device as claimed in claim 1, in which the said attachment means is a buckle having two parts, one of which is connected to the structure of the vehicle by the intermediary, or without the intermediary of a third portion, the other part comprising a ring which is crossed by the strap and which is of sufficient dimensions so as to be crossed by said buckle component or buckle component part when said component is activated.

4. A safety belt device as claimed in claim 1 wherein a part of said customary buckle component is irremovably secured to the structure of the vehicle and wherein the other part of said customary buckle component forms the end of the strap which is far from the end connected to the winder/unwinder.

5. A safety belt device as claimed in claim 1, and intended for a motor vehicle having door windows, the said device comprising means for activating the said component which are positioned so as to be very easily accessible either by the user of the said device or by an eventual rescuer, advantageously on a pillar of the automobile, in the vicinity of the lower part of a door window.

6. A safety belt device as claimed in claim 1 and intended for a vehicle having a dashboard, the said device comprising control means for activating the said component, these control means comprising an assembly of control elements, at least one of which is fitted onto a pillar of the vehicle and another of which is installed on the dashboard or outside the said vehicle.

7. A safety belt device for a vehicle, especially of the automobile type, this device comprising an assembly of devices as claimed in claim 1 and at least one control means for separating each of the straps from the said device assembly.

8. A safety belt device as claimed in claim 1 and intended to equip a vehicle of the automobile type, in which the anchorage point is fitted onto a pillar of the automobile.

* * * * *